(12) United States Patent
Woo (10) Patent No.: US 9,197,933 B2
(45) Date of Patent: Nov. 24, 2015

(54) DISPLAY APPARATUS AND METHOD FOR CONTROLLING THE SAME

(71) Applicant: SAMSUNG ELECTRONICS CO., LTD., Suwon-si (KR)

(72) Inventor: Chung-ki Woo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 409 days.

(21) Appl. No.: 13/650,895

(22) Filed: Oct. 12, 2012

(65) Prior Publication Data

US 2013/0093778 A1 Apr. 18, 2013

(30) Foreign Application Priority Data

Oct. 12, 2011 (KR) .............................. 2011-0104322

(51) Int. Cl.
*G06F 12/02* (2006.01)
*G06T 1/60* (2006.01)
*H04N 21/442* (2011.01)
*H04N 21/443* (2011.01)

(52) U.S. Cl.
CPC ........ *H04N 21/4424* (2013.01); *G06F 12/0223* (2013.01); *H04N 21/443* (2013.01); *H04N 21/4435* (2013.01)

(58) Field of Classification Search
CPC ................ G06F 15/167; G06F 12/02–12/0292

USPC .................................. 345/541, 542, 543, 544
See application file for complete search history.

(56) References Cited

U.S. PATENT DOCUMENTS

| 2005/0140685 | A1* | 6/2005 | Garg .............................. 345/543 |
| 2007/0118712 | A1* | 5/2007 | van Riel et al. ................ 711/170 |
| 2007/0233999 | A1* | 10/2007 | Jerding et al. ................. 711/171 |

FOREIGN PATENT DOCUMENTS

EP 2 326 076 A1 5/2011

OTHER PUBLICATIONS

Communication dated Sep. 21, 2012, issued by the European Patent Office in counterpart European Patent Application No. 12162275.7.
Communication dated May 12, 2015 issued by the European Patent Office in counterpart European Patent Application No. 12 162 275.7.

* cited by examiner

*Primary Examiner* — Jacinta M Crawford
(74) *Attorney, Agent, or Firm* — Sughrue Mion, PLLC

(57) ABSTRACT

A display apparatus is provided. The display apparatus includes a signal processor which processes a broadcast signal; an application executor which executes at least one application; a storage which stores a code command to change a use of a memory area, the storage including a first memory area allocated for processing the broadcast signal and a second memory area allocated for execution of the application; and a controller which, if the application is executed, changes, based on the code command, the first memory area to an area for execution of the application.

15 Claims, 8 Drawing Sheets

```
VDL inux#> cat /proc/meminfo

MemTotal :      376624 kB
MemFree :       319108 kB  ~411
Buffers :         1656 kB
...
...
Inactive(file):   3640 kB
Unevictable:     51200 kB  ~413
Mlocked:             0 kB
```
~410

FIG. 4B

```
VDL inux#> cat /proc/meminfo

MemTotal :        376624 kB
MemFree :         369108 kB    ~421
Buffers :           1656 kB
...
...
Inactive(file):     3640 kB
Unevictable:           0 kB    ~423
Mlocked:               0 kB
```
~420

DISPLAY APPARATUS AND METHOD FOR CONTROLLING THE SAME

CROSS-REFERENCE TO RELATED APPLICATIONS

This application claims priority from Korean Patent Application No. 2011-0104322, filed in the Korean Intellectual Property Office on Oct. 12, 2011, the disclosure of which is herein incorporated by reference.

BACKGROUND

1. Field

Apparatuses and methods consistent with the present disclosure relate to a display apparatus and a method for controlling the same, and more particularly, to a display apparatus which is capable of executing an application and a method for controlling the same.

2. Description of the Related Art

With the rapid development of electronic apparatuses recently, the functions of a display apparatus are not limited to displaying a broadcasting signal and have been expanded to providing various contents to users by supporting various applications.

Accordingly, users may be provided not only with audio and video files but also with various contents such as web-surfing and games.

Meanwhile, displays typically have very limited memory capacity and thus, when users try to use contents through applications, the display may stop its operation or may not execute a specific application due to insufficient memory capacity.

In order to address the above issues, a separate hardware memory may be added, but this increases costs.

SUMMARY

It is an aspect of the present inventive concept to provide a display apparatus which may provide enough memory capacity for executing applications by changing a memory area allocated for processing a broadcast signal to an area for executing applications based on a pre-stored code command, and a method for controlling the same.

According to an aspect of one or more exemplary embodiments, there is provided a display apparatus that includes a signal processing unit which processes a broadcast signal, an application execution unit which executes at least one application, a storage unit which stores a code command to change a use of a memory area, the storage area including a first memory area allocated for processing the broadcast signal and a second memory area allocated for execution of the application, and a control unit which, if the application is executed, changes, based on the code command, the first memory area to an area for execution of the application.

The control unit, if a predetermined event occurs while the first memory area is changed to an area for execution of the application, may restore the changed first memory are back to the area for processing the broadcast signal.

The predetermined event may be a user command to end the application being executed, or a user command to display the broadcast signal.

The control unit, if the first memory area is restored back to an area for processing the broadcast signal, may move data stored in the first memory area during execution of the application to the second memory area and store the data therein.

The display apparatus according to an exemplary embodiment may further include a display unit, and the control unit may control to display available memory capacity allocated for execution of the application on the display unit according to the change of memory use based on the code command.

The control unit may perform a control operation under a Linux operating system.

The storage unit may further include a kernel area, and the code command may be stored in the kernel area.

The first memory area may be a hardware memory and the second memory area may be a system memory.

The code command may include at least one of a code command for securing the hardware memory as the system memory, and a code command for restoring the secured system memory back to the hardware memory.

According to an aspect of one or more exemplary embodiments, there is provided a method for controlling a display apparatus which includes a first memory area allocated for processing a broadcast signal and a second memory area allocated for execution of an application, the method comprising determining whether the application is executed, if the application is executed, changing, based on a pre-stored code command to change use of a memory area, the first memory area to an area for execution of the application, and executing the application using the second memory area, and the first memory area whose use is changed for execution of the application.

The method may further include, if a predetermined event occurs while the first memory area is changed to an area for execution of the application, restoring the changed first memory are back to the area for processing the broadcast signal.

The predetermined event may be a user command to end the application being executed, or a user command to display the broadcast signal.

The restoring may further include, if the first memory area is restored back to an area for processing the broadcast signal, moving data stored in the first memory area during execution of the application to the second memory area and storing the data therein.

The method according to an exemplary embodiment may further include displaying available memory capacity allocated for execution of the application on the display unit according to the change of memory use based on the code command.

The display apparatus may perform a control operation under a Linux operating system.

The display apparatus may further include a kernel area, and the code command may be stored in the kernel area.

The first memory area may be a hardware memory and the second memory area may be a system memory.

The code command may include at least one of a code command for securing the hardware memory as the system memory and a code command for restoring the secured system memory back to the hard wary memory.

BRIEF DESCRIPTION OF THE DRAWINGS

These and/or other aspects will become apparent and more readily appreciated from the following description of exemplary embodiments, taken in conjunction with the accompanying drawings, of which.

DETAILED DESCRIPTION

Reference will now be made in detail to the exemplary embodiments, examples of which are illustrated in the accompanying drawings, wherein like reference numerals refer to like elements throughout. The exemplary embodiments are described below, in order to explain the present inventive concept by referring to the figures.

Figure 1:
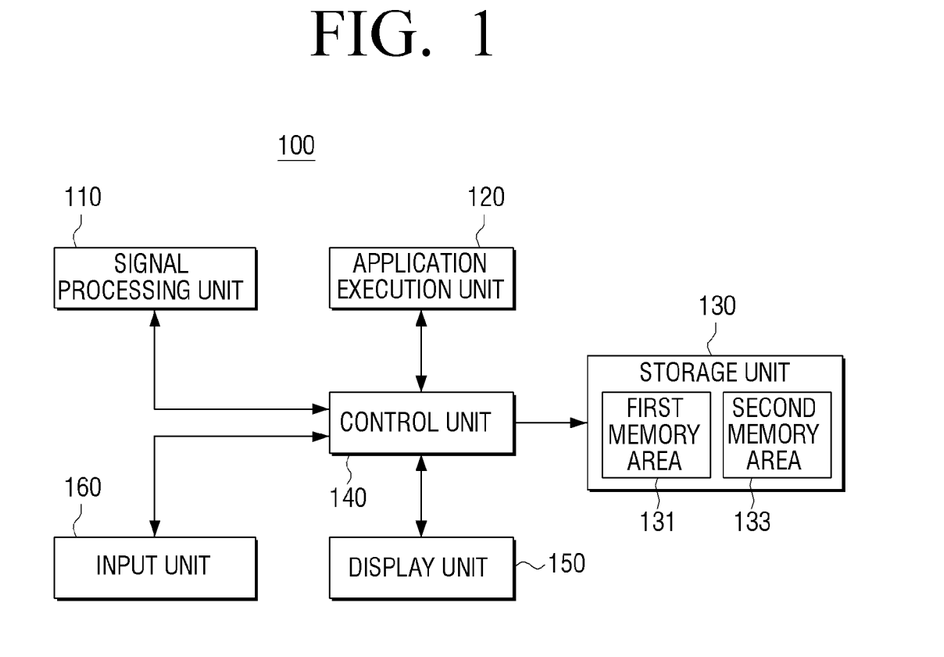
FIG. 1 is a block diagram to explain a configuration of a display apparatus according to an exemplary embodiment.

FIG. 1 is a block diagram to explain configuration of a display apparatus according to an exemplary embodiment. A display apparatus 100 may be a television, a set-top box, a DVD player, a mobile terminal, a desk-top PC or a lap-top PC, but the display apparatus 100 is not limited thereto. Any electronic apparatus which can support an application may be the display apparatus 100 according to the exemplary embodiment.

The display apparatus 100 includes a signal processing unit 110, an application execution unit 120, a storage unit 130, a control unit 140, a display unit 150, and an input unit 160 as illustrated in FIG. 1.

The signal processing unit 110 processes a broadcast signal. Specifically, the signal processing unit 110 may process a broadcast signal received from outside the display apparatus 100, or pre-stored to be in the form of a signal that can be output from the display unit 150. The broadcast signal includes an image signal, an audio signal, and broadcast information, and the image signal may be encoded using a MPEG (Moving Picture Experts Group)-2 method.

That is, the signal processing unit 110 has an MPEG decoder (not shown) and may decode an image signal included in a broadcast signal, perform video-scaling, image-processing, etc. with respect to the decoded image signal, and transmit the processed signal to the display unit 150.

The display apparatus 100 may further include a receiving unit (not shown) which has a tuner to receive a broadcast signal transmitted from a broadcasting company or a satellite and demodulates the received broadcast signal, and a signal diving unit (not shown) which divides a received broadcast signal into an image signal, an audio signal and broadcast information.

The signal processing unit 110 may process not only a broadcast signal received through a turner but also an image signal input from an external source device such as a DVD player. To do so, the display apparatus 100 according to an exemplary embodiment may further include an interface unit (not shown) to receive an image signal from an external source device.

The application execution unit 120 executes at least one application. Specifically, the application execution unit 120 may execute an application based on an application execution command of a user.

The application may be, for example, a web browser or an application program which can be executed in various operation systems. In addition, the application may include, for example, a widget such as a breaking news widget, a weather forecast widget, a game widget, etc.

At least one application which can be executed in the display apparatus 100 is installed in the application execution unit 120, and the application execution unit 120 may download an application from outside the display apparatus 100 and install the application.

In FIG. 1, the application execution unit 120 and the control unit 140 are illustrated as separate components from each other, but this is only an example provided for convenience of explanation. That is, the application execution unit 120 and the control unit 140 may be configured as separate processing blocks which are physically separated from one another, or may be configured as one processing block where the two components are merged therein.

The storage unit 130 stores various programs for operating the display apparatus 100, and may be configured as a volatile memory such as a Dynamic Random Access Memory (DRAM) or a Static Random Access Memory (SRAM) from which stored data is removed if power supply to the DRAM or SRAM is stopped, or a non-volatile memory such as a flash memory, a Ferroelectric Random Access Memory (FRAM), and a Phase-change Random Access Memory (PRAM) from which stored data is not removed even if power supply is stopped. The storage unit 130 stores programs permanently or temporarily for operating the display apparatus 100.

The storage unit 130 may include a first memory area 131 allocated for processing a broadcast signal and a second memory area 133 allocated for executing an application.

Specifically, the first memory area 131 which is an area used for decoding a broadcast signal provides a storage area for decoding a broadcast signal and may store a decoded image signal. The first memory area 131 is a hardware memory and in the case of Linux, the first memory area 131 may include an H/W memory area.

The second memory area 133 provides a storage area for executing an application and may store data generated as a result of the execution of the application. The second area 133 is a system memory, and in the case of Linux, the second memory area may include a stack area, a heap area, a data area (bss) and a code area (text).

Herein, the data area and the code area may store application data and application update data. Specifically, the code area stores program codes, that is, machine commands executed by a central processing unit (CPU). A global variable and a static variable are designated in the data area. The global and static variables are designated at the time when an application starts, and removed when the application ends.

The data of a read application and update data of a read application are stored in the heap area and the stack area, and the heap area and the stack area may be used during a runtime. Specifically, the heap area is an area where a dynamic memory is designated according to a dynamic memory allocation function which is called from an application and is allocated and released by a user. The stack area is where a memory is allocated statically and a local variable and a mediating variable are stored. The allocated variable disappears when a function call is completed.

Taking an example of a process of the display apparatus 100 according to an exemplary embodiment, text, data, and bss of a display apparatus process increase in the code area and the data area, and the heap area and the stack area may be a memory area which is used by being allocated dynamically in the display apparatus process. Herein, the process may be an independent execution unit of software.

The first memory area 131 and the second memory area 133 may be provided in a non-volatile memory such as a DRAM and an SRAM.

The storage unit 130 may store a code command for changing the use of a memory area. Herein, the code command for changing the use of a memory area may include a code command for changing the first memory area 131 allocated for processing a broadcast signal into an area for executing an application, and a code command for restoring the first memory area 131 of which use is changed for execution of an application back to an area for processing a broadcast signal.

That is, if the first memory area 131 and the second memory area 133 are a system memory and a hardware memory respectively, code commands for changing the use of a memory area may include at least one of a code command for securing a hardware memory as a system memory, and a code command for restoring a secured system memory back to a hardware memory.

The display unit 150 outputs at least one of contents regarding a broadcast signal or an executed application.

In addition, the display unit 150 may display an available capacity of a memory area allocated for execution of an application. Specifically, if the first memory area 131 is changed to an area for execution of an application, the display unit 150 may display an available capacity of a memory area for execution of an application by adding the available capacity of the first memory area 131 to the available capacity of the second memory area 133.

The display unit 150 may include a display panel (not shown) which is realized in the form of a Liquid Crystal Display (LCD), an Organic Light Emitting Display (OLED) or a Plasma Display Panel (PDP) and a panel driving unit (not shown) which drives a display panel.

The input unit 160 receives a user command. Specifically, the input unit 160 may receive a command to execute an application, a command to end an application, a command to select a channel, a command to select one of image signals input from at least one external source device, etc.

The input unit 160 may be realized as a touch screen, a touch pad, a key button, or a key pad, or may be configured to receive a user command input from a remote controller (not shown) such as a remote device.

The control unit 140 controls overall operations of each component included in the display apparatus 100.

In particular, if an application is executed, the control unit 140 may change the first memory area 131 to an area for execution of an application, based on code commands for changing the use of a memory area.

Specifically, if a command to execute an application is input, the control unit 140 may call a code command for changing the use of a memory area stored in the storage unit 130 and change the first memory area 131 to an area for execution of an application using the code commands.

Accordingly, the area for execution of an application is extended to the first memory area 131 and the second memory area 133 and thus, enough storage area may be secured for the execution of an application.

If an event occurs while the first memory area 131 is changed to an area for the execution of an application, the first memory area 131 may be restored to an area for processing a broadcast signal. Herein, the event may include, for example, a user command to end an application being executed, or a user command to display a broadcast signal, that is, a command to select a channel.

Specifically, if a command to end an application being executed or a command to select a channel is input, the control unit 140 may call a code command to change the use of a memory area stored in the storage unit 130 and change the first memory area 131 to an area for processing a broadcast signal based on the code command to restore the first memory area 131 to an area for processing a broadcast signal.

In this case, the control unit 140 may move data stored in the first memory area 131 during execution of an application to the second memory area 133 and store the data therein.

In other words, if an application is executed using the first memory area 131 which is changed to an area for execution of an application, data generated as a result of execution of an application may be stored in the first memory area 131. Accordingly, if the first memory area 131 is restored to an area for processing a broadcast signal, the control unit 140 may move the data stored in the first memory area 131 to the second memory area 133 for execution of an application and store the data therein.

In the exemplary embodiment, the first memory area which is allocated for processing of a broadcast signal is changed to an area for execution of an application. However, alternatively, the second memory area which is allocated for execution of an application may be changed to an area for processing a broadcast signal. Accordingly, a storage area for processing a broadcast signal may be increased.

The control unit 140 may perform the above control operation under a Linux operating system. In this case, the storage unit 130 may further include a kernel area and the above-mentioned code command may be stored in the kernel area. Herein, the kernel area denotes a Linux operating system which is responsible for management of a process in a volatile memory, input and output management, file management, communication between processes, overall hardware management, etc.

Specifically, if a command to execute an application is input, the control unit 140 may call a code command to change an H/W memory area stored in a kernel area to an area for execution of an application and change the H/W memory area to an area for execution of an application in accordance with the code command. That is, the control unit 140 may further allocate a storage area constituting the H/W memory area to a stack area, a heap area, a data area, and a code area.

If a command to end an application or a command to select a channel is input, the control unit 140 may call a code command to restore an H/W memory area stored in a kernel area to an area for processing a broadcast signal and change the H/W memory area to an area for processing a broadcast signal in accordance with the code command. That is, the control unit 140 allocates the H/W memory area for processing a broadcast signal in order to perform original functions of the display apparatus 100.

If an application is not executed, that is, if a display apparatus performs its original functions (for example, displaying a broadcast signal), a hardware memory for processing a broadcast signal, that is, an H/W memory area is allocated. On the other hand, if an application is executed, that is, if a display apparatus does not perform its original functions, there is no need for an H/W memory area for hardware and thus, the storage area constituting the H/W memory area is further allocated to a stack area, a heap area, a data area, and a code area. In other words, the memory usually exclusively used for hardware may be used by a system.

Accordingly, available memories during run-time which are a stack area, a heap area, a data area, and a code area may be further obtained and thus, enough storage area may be secured in a embedded system even if an application code or data increases.

In addition, according to an exemplary embodiment, if an application is executed or ended, a code command stored in a kernel area is called to change an H/W memory area to an area for execution of an application or the changed memory area is restored back to the H/W memory area for processing a broadcast signal. That is, a memory area itself is changed in a kernel area based on code commands stored in the kernel area and thus, no separate operation to distinguish source codes for allocating an H/W memory area is required in an application level. As a result, burdens shouldered by application developers may be reduced.

In the above exemplary embodiment, the first memory area is allocated for decoding an image signal, but this is only an example. That is, the first memory area may be used not only for decoding of an image signal but also for tuning of a broadcast signal or may be used for a panel driving unit to drive a display unit.

Figure 2A:
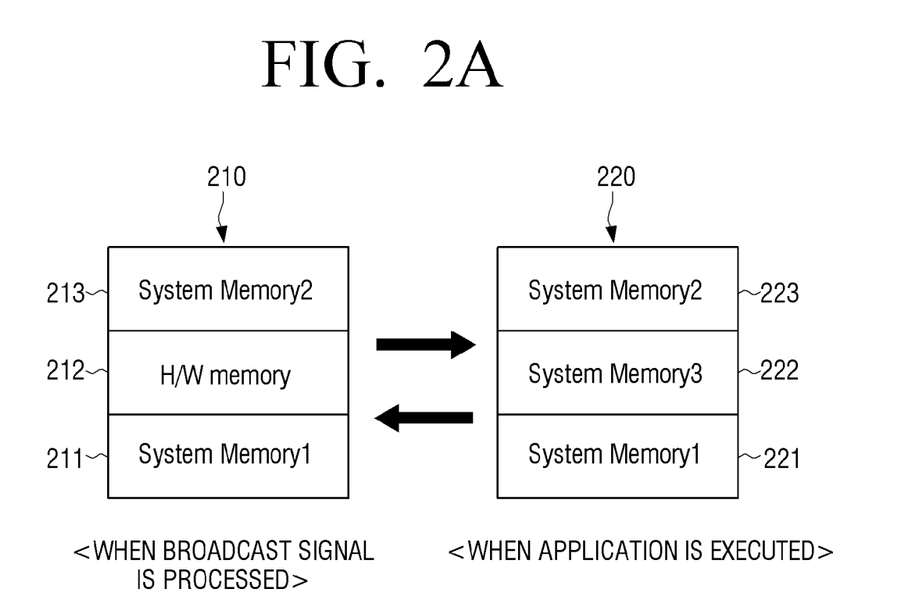
FIGS. 2A and 2B are views to explain an example of changing use of a memory according to an exemplary embodiment.
Figure 2B:
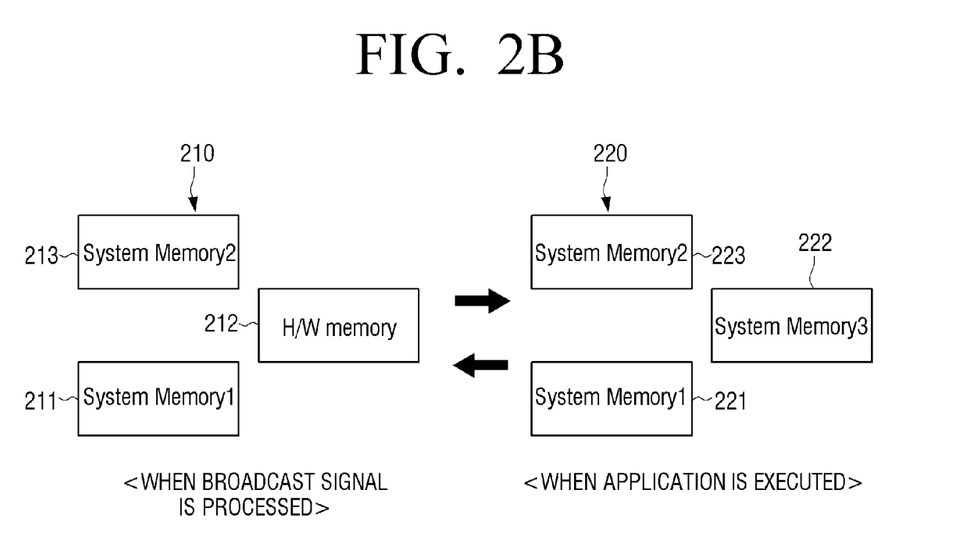

FIGS. 2A and 2B are views to explain an example of changing use of a memory according to an exemplary embodiment. Specifically, FIG. 2A illustrates a case where there is one memory bank and FIG. 2B illustrates a case where there are two memory banks.

As illustrated in FIGS. 2A and 2B, a volatile memory 210 in a storage area includes a system memory1 211, a system memory2 213 and a hardware memory 212 while a broadcast signal is being processed. Herein, the hardware memory 212 is an area allocated for processing a broadcast signal and thus, the signal processing unit 110 may decode an image signal using only the hardware memory 212 under the control of the control unit 140.

The system memory1 211 and system memory2 213 are areas allocated for execution of an application and thus, the application execution unit 120 may execute an application using only the system memory1 211 and system memory2, 213.

Subsequently, once an application is executed, the hardware memory 212 is changed to the system memory3 222 in terms of use. Accordingly, the application execution unit 120 may execute an application not only using the existing system memory1 221, system memory2 223 but also the system memory3 222 whose use has been changed. Therefore, the disadvantages caused by lack of memory during execution of an application may be resolved.

If an application is ended, the memory area which has been changed to be used for execution of an application is restored back to the hardware memory 212 for processing a broadcast signal. Accordingly, an image signal may be decoded using the hardware memory 212 and the processed image signal may be output.

Figure 3:
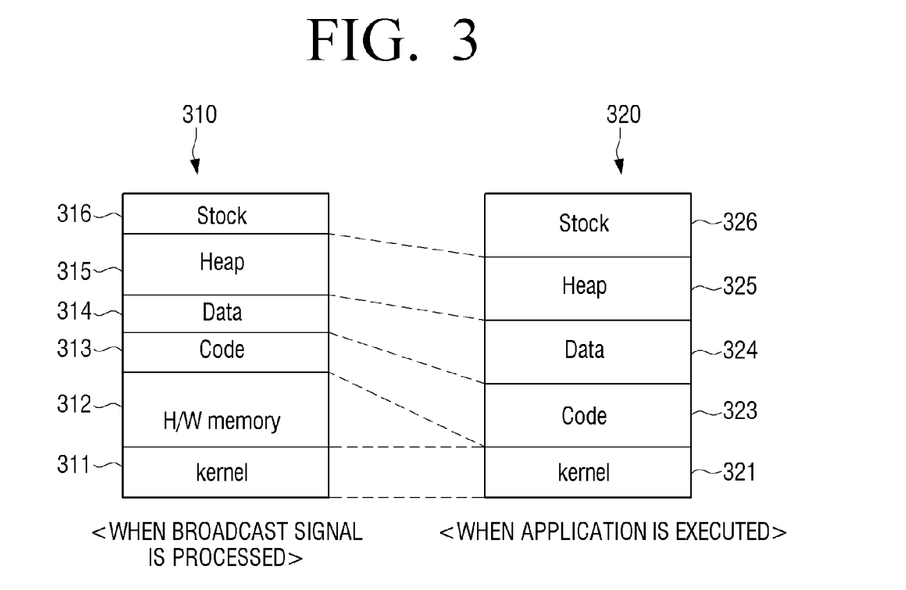
FIG. 3 is a view to explain an example of changing use of a memory in greater detail according to an exemplary embodiment.

FIG. 3 is a view to explain an example of changing use of a memory in greater detail according to an exemplary embodiment. In FIG. 3, it is assumed that an operating system is Linux, and the case of processing a broadcast signal is illustrated on the left and the case of executing an application is illustrated on the right.

A kernel area 311, 321 is a kernel of a Linux operating system, and is in charge of management of processes which exist in a volatile memory 310, 320, input output management, file management, communication between processes, and overall H/W management.

The H/W memory area 312 is a memory used for hardware, and is in charge of decoding of an image signal and driving of a tuning display panel of a broadcast signal.

If an application is not executed, the volatile memory 310 is allocated as illustrated on the left. In this case, the display apparatus 100 allocates a hardware memory for operation of a device, that is, the H/W memory area 312 so as to process and output a broadcast signal. The volatile memory 310 allocates a code area 313, a data area 314, a heap area 315 and a stack area 316 for execution of an application.

If an application is executed, the volatile memory 320 is allocated as illustrated on the right. In this case, the display apparatus 100 does not process and output a broadcast signal and thus, a separate H/W memory area is not allocated. That is, the display apparatus 100 changes an H/W memory area to an area for execution of an application and a storage area constituting the H/W memory area is further allocated to a code area 323, a data area 324, a heap area 325 and a stack area 326.

In other words, comparing the volatile memory on the left and right in FIG. 3, the code area 323, the data area 324, the heap area 325, and the stack area 326 of the volatile memory 320 illustrated on the right have increased, securing further memory area for execution of an application.

Figure 4A:
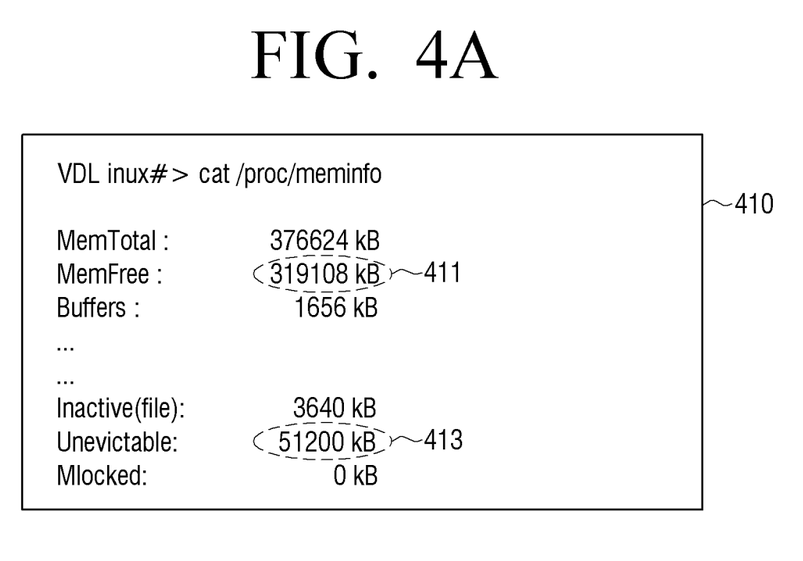
FIGS. 4A and 4B are views to explain a method for displaying available memory capacity according to an exemplary embodiment.
Figure 4B:
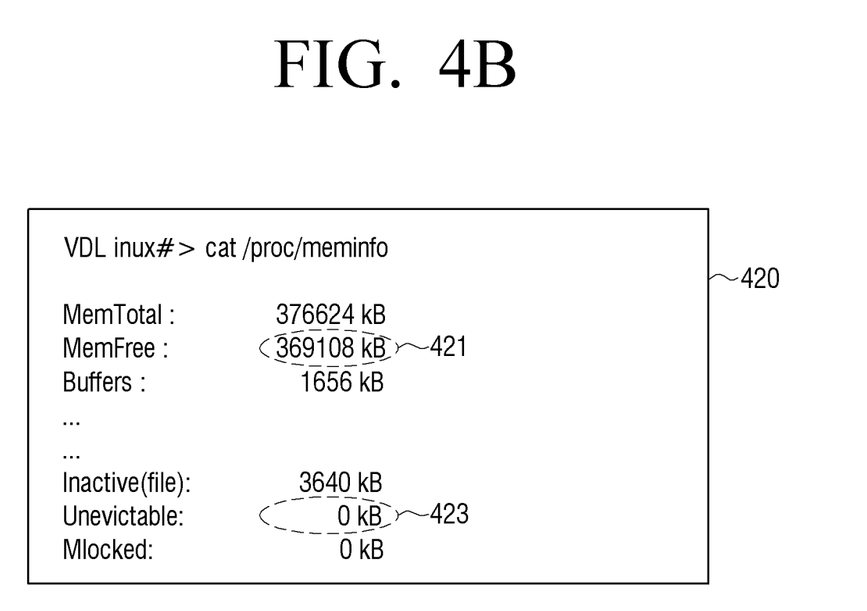

FIGS. 4A and 4B are views to explain a method for displaying available memory capacity according to an exemplary embodiment. Specifically, FIGS. 4A and 4B are User Interface (UI) windows displaying available memory capacity and it is assumed that an H/W memory consumes 50 MByte.

FIG. 4A illustrates a memory area allocated in a volatile memory before execution of an application. Specifically, a system memory 411, that is, the memory capacity allocated for execution of an application, is 319108 KB, and an M/H memory 413, that is, the memory allocated for processing a broadcast signal, is 51200 KB.

FIG. 4B illustrates a memory area allocated in a volatile memory after execution of an application. As illustrated in FIG. 4, once an application is executed, the area allocated in an M/H memory is changed to a system memory and thus, an M/H memory 423 becomes 0 KB and a system memory 421 becomes 369108 KB as the storage area allocated in the M/H memory is further allocated.

The display apparatus according to an exemplary embodiment displays the available memory capacity through a UI window and thus, a user may easily identify available memory capacity according to execution and termination of an application.

Figure 5:
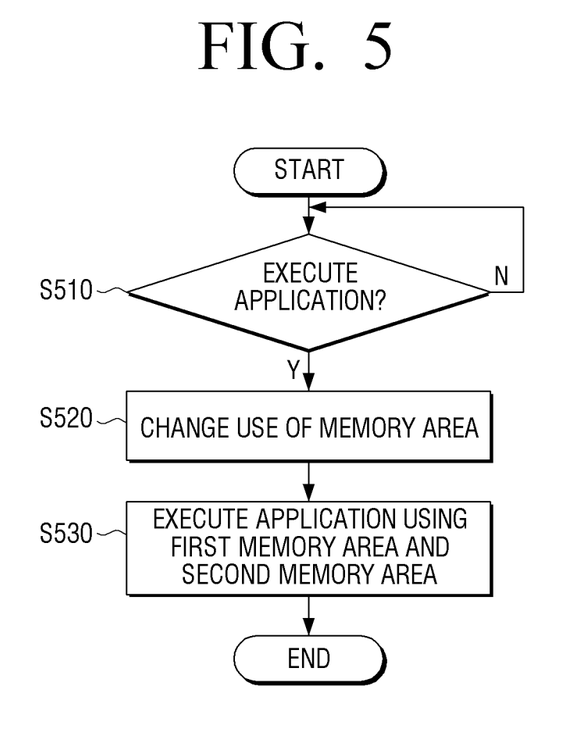
FIG. 5 is a flowchart to explain a method for controlling a display apparatus according to an exemplary embodiment.

FIG. 5 is a flowchart to explain a method for controlling a display apparatus according to an exemplary embodiment. Herein, the display apparatus comprises a first memory area allocated for processing a broadcast signal and a second memory area allocated for executing an application. Specifically, the first memory area is a hardware memory and the second memory area is a system memory.

It is determined whether an application is executed (S510).

If an application is not executed (S510-N), the process returns to the start. If an application is executed (S510-Y), the first memory area is changed to an area for execution of the application based on pre-stored code commands for changing use of a memory area (S520).

Herein, the code commands may include a code command for changing the first memory area allocated for processing a broadcast signal to an area for execution of an application and a code command for restoring the first memory area of which use is changed for execution of an application back to an area for processing a broadcast signal. That is, at least one of a code command for securing a hardware memory as a system memory and a code command for restoring the secured system memory back to the hardware memory may be included.

Subsequently, an application is executed using the second memory area, and the first memory area of which use is changed for execution of an application (S530).

If an event occurs while the first memory area is changed to an area for the execution of an application, the first memory area may be restored to an area for processing a broadcast signal. Herein, the event may include a user command to end an application being executed or a user command to display a broadcast signal.

If the first memory area is restored to an area for processing a broadcast signal, the date stored in the first memory area during execution of an application may be moved to the second memory area and stored therein.

After operation S530, available memory capacity allocated for execution of an application may be displayed according to change of memory use based on code commands.

The display apparatus according to an exemplary embodiment may perform a control operation under a Linux operating system. In this case, the display apparatus further includes a kernel area and a code command may be stored in the kernel area.

Figure 6:
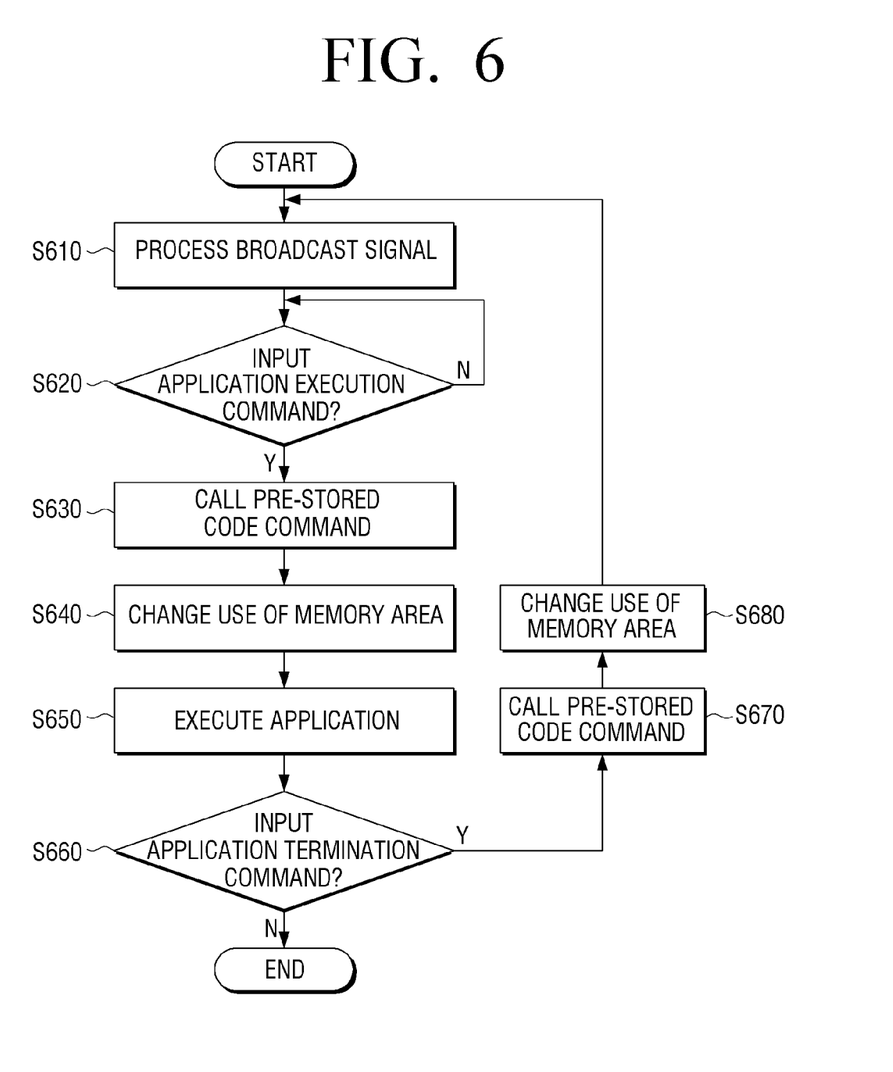
FIG. 6 is a flowchart to explain a method for controlling a display apparatus in greater detail according to an exemplary embodiment.

FIG. 6 is a flowchart to explain a method for controlling a display apparatus in greater detail according to an exemplary embodiment. As described above with regard to FIG. 5, the display apparatus comprises the first memory area (a hardware memory) allocated for processing a broadcast signal and the second memory area (a system memory) allocated for execution of an application. The display apparatus may perform a control operation under a Linux operating system.

A display apparatus processes a broadcast signal (S610). Specifically, the display apparatus performs signal-processing such as decoding of an image signal included in a broadcast signal using the first memory area allocated for processing a broadcast signal and displays the signal-processed broadcast signal. The first memory area may be allocated so as to be used for a tuner to turn a broadcast signal or for a panel driving unit to drive a display unit.

It is determined whether an application is executed (S620). Herein, the application may be a web browser or an application program which can be executed in various operation systems. In addition, the application may include a widget such as a breaking news widget, a weather forecast widget, or a game widget, etc.

It is determined whether a command to execute an application is input (S620). If no command is input (S620-N), the process returns to operation S620. If a command to execute an application is input (S620-Y), a pre-stored code command is called (S630). Herein, the code command is pre-stored in a kernel area, and may be a code command to change the first memory area allocated for processing a broadcast signal to an area for execution of an application.

The use of a memory area is changed based on the called code command (S640). Specifically, a hardware memory is changed to a system memory in terms of use so that the memory exclusively used for hardware can be used by a system. Accordingly, a stack area, a heap area, a data area, and a code area are further allocated to a storage area constituting an H/W memory area.

An application is executed (S650). Specifically, an application is executed using the stack area, the heap area, the data area, and the code area which are further allocated to the storage area constituting an H/W memory area.

It is determined whether a command to end an application is input (S660). Alternatively, it is determined whether a command to display a broadcast signal, that is, a command to select a channel, is input.

If a command to end an application is not input (S660-N), the process ends. If a command to end an application is input (S660-Y), a pre-stored code command is called (S670). Herein, the code command is pre-stored in a kernel area and the code command may be a command to restore the first memory area of which use is changed for execution of an application back to an area for processing a broadcast signal.

Accordingly, the use of a memory area is changed based on the called code command (S680). Specifically, the hardware memory which is changed to a system memory is changed back to an area for hardware. That is, the hardware memory is changed to an H/W memory area and a broadcast signal is processed using the H/W memory area again (S610).

As described above, according to an exemplary embodiment, a stack area, a heap area, a data area, and a code area are further obtained when an application is executed and thus, enough storage area can be secured in an embedded system.

In addition, a memory area is changed based on code commands pre-stored in a kernel area and thus, no separate operation to distinguish source codes for allocating a memory area is used in an application level. As a result, burdens shouldered by application developers may be reduced.

In the exemplary embodiment, a computer-readable-recording-medium for executing the above-described method for controlling a display apparatus may be included. The recording medium readable by a computer includes all kinds of recording media where data readable by a computer system is stored. The recording medium readable by a computer includes ROM, RAM, CD-ROM, magnetic tape, floppy disk, optical data storage apparatus, and etc. Meanwhile, the recording medium readable by a computer may be distributed in a computer system connected via network, and may store and execute a code readable by a computer using a distribution method.

According to various exemplary embodiments, as further memory is obtained while an application is secured, enough storage area may be secured during a run-time.

In addition, a memory area is changed based on pre-stored code commands and thus, no separate operation is used in an application level to secure further memory. As a result, burdens shouldered by application developers may be reduced.

Although a few exemplary embodiments of the present inventive concept have been shown and described, it would be appreciated by those skilled in the art that changes may be made in the exemplary embodiments without departing from the principles and spirit of the invention, the scope of which is defined in the claims and their equivalents.

What is claimed is:

1. A display apparatus comprising:
   a signal processing unit which processes a broadcast signal;
   an application execution unit which executes an application;
   a storage unit which stores a code command to change a use of a memory area, the storage unit including a first memory area allocated for processing the broadcast signal and a second memory area allocated for execution of the application; and
   a control unit which, if the application is executed, changes, based on the code command, the first memory area to an area for execution of the application,
   wherein the control unit, if a predetermined event occurs while the first memory area is changed to the area for execution of the application, restores the changed first memory area back to an area for processing the broadcast signal and moves data stored in the first memory area during execution of the application to the second memory area.

2. The display apparatus as claimed in claim 1, wherein the predetermined event is a user command to end the application being executed, or a user command to display the broadcast signal.

3. The display apparatus as claimed in claim 1, further comprising:
a display unit,
wherein the control unit controls to display available memory capacity allocated for execution of the application on the display unit according to the change of memory use based on the code command.

4. The display apparatus as claimed in claim 1, wherein the control unit performs a control operation under a Linux operating system.

5. The display apparatus as claimed in claim 4, wherein the storage unit further includes a kernel area,
wherein the code command is stored in the kernel area.

6. The display apparatus as claimed in claim 1, wherein the first memory area is a hardware memory and the second memory area is a system memory.

7. The display apparatus as claimed in claim 6, wherein the code command includes at least one of a code command for securing the hardware memory as the system memory, and a code command for restoring the secured system memory back to the hardware memory.

8. A method for controlling a display apparatus which includes a first memory area allocated for processing a broadcast signal and a second memory area allocated for execution of an application, the method comprising:
determining whether the application is executed;
if the application is executed, changing, based on a pre-stored code command to change use of a memory area, the first memory area to an area for execution of the application;
executing the application using both the second area and the first memory area whose use is changed for execution of the application; and
if a predetermined event occurs while the first memory area is changed to the area for execution of the application, restoring the changed first memory area back to an area for processing the broadcast signal and moving data stored in the first memory area during execution of the application to the second memory area.

9. The method as claimed in claim 8, wherein the predetermined event is a user command to end the application being executed, or a user command to display the broadcast signal.

10. The method as claimed in claim 8, further comprising:
displaying available memory capacity allocated for execution of the application on the display unit according to the change of memory use based on the code command.

11. The method as claimed in claim 8, wherein the display apparatus performs a control operation under a Linux operating system.

12. The method as claimed in claim 11, wherein the display apparatus further include a kernel area,
wherein the code command is stored in the kernel area.

13. The method as claimed in claim 8, wherein the first memory area is a hardware memory and the second memory area is a system memory.

14. The method as claimed in claim 13, wherein the code command includes at least one of a code command for securing the hardware memory as the system memory and a code command for restoring the secured system memory back to the hardware memory.

15. The display apparatus as claimed in claim 1, wherein the control unit controls the application execution unit to execute the application using both the second memory area and the first memory area whose use is changed for execution of the application.

* * * * *